United States Patent [19]
Sacks et al.

[11] Patent Number: 6,111,975
[45] Date of Patent: Aug. 29, 2000

[54] MINIMUM DIFFERENCE PROCESSOR

[76] Inventors: Jack M. Sacks, 815 Tamlei Ave., Thousand Oaks, Calif. 91362; Thomas K. Lo, 8843½ Longden Ave., Temple City, Calif. 91780; Nam D. Banh, 20644 Wyandotte St., Canoga Park, Calif. 91306; Charles A. McNary, 24123 Park Granada, Calabasas, Calif. 91302; Franklin J. Meyers, 23703 Sandalwood St., Canoga Park, Calif. 91304

[21] Appl. No.: 08/723,482

[22] Filed: Jan. 11, 1996

Related U.S. Application Data

[63] Continuation of application No. 07/673,618, Mar. 22, 1991, abandoned.

[51] Int. Cl.[7] ................................................. G06K 9/00
[52] U.S. Cl. ........................ 382/103; 348/155; 382/205
[58] Field of Search ................................. 382/103, 205, 382/209, 218, 236; 348/154, 155

[56] References Cited

U.S. PATENT DOCUMENTS

| | | | |
|---|---|---|---|
| 4,703,513 | 10/1987 | Gennery | 382/27 |
| 4,736,439 | 4/1988 | May | 382/54 |
| 4,783,840 | 11/1988 | Song | 382/27 |
| 4,809,343 | 2/1989 | Wakabayashi et al. | 382/27 |
| 4,827,533 | 5/1989 | Tanaka | 382/54 |
| 4,947,446 | 8/1990 | Jutand et al. | 382/27 |
| 5,020,121 | 5/1991 | Rosenberg | 382/27 |

*Primary Examiner*—Joseph Mancuso
*Attorney, Agent, or Firm*—David W. Collins; Andrew J. Rudd; Glenn H. Lenzen, Jr.

[57] ABSTRACT

A process for reducing background clutter of a scene, and isolating an object of interest. The process includes calculating a minimum output from a plurality of appropriately configured anti-median filters representing a minimum difference processor (MDP) filter. In a first embodiment, the MDP filter includes a (5×5) matrix of elements wherein each element has an intensity value representation of the scene. A first anti-median filter array is configured as a horizontal array of 5 pixel elements in which the center element of the matrix is the center element of the horizontal array. A median value of the 5 elements of the horizontal array is determined, and is subtracted from the value of the center element to determine an anti-median value of the horizontal array. The same process is performed for a vertical 5 element anti-median array, and two diagonal 5 element anti-median arrays, all including the center element of the matrix as the center common element of the arrays. The lowest anti-median value is then outputted as the output of the MDP filter. In a second embodiment, the values of the remaining elements of the matrix which were not included in any of the horizontal, vertical or diagonal arrays described above are subtracted from the center element of the matrix. The lowest value from the group of anti-median values together with the remaining subtracted values is outputted from the MDP filter. This enables the background clutter of the scene to be substantially suppressed or eliminated.

5 Claims, 8 Drawing Sheets

MINIMUM DIFFERENCE PROCESSOR

This is a continuation of application Ser. No. 07/673,618 filed Mar. 22, 1991 now abandoned.

BACKGROUND OF THE INVENTION

1. Technical Field

This invention relates generally to a method and apparatus f or filtering an image, and more specifically, to a method and apparatus for filtering and thereby removing background clutter from an image of an imaging and targeting system.

2. Discussion of the Related Art

Image processing systems which autonomously acquire or track a target moving against a cluttered background are known in the art. To accurately track the target, these systems must employ background clutter suppression methods to reduce or eliminate the background clutter, and thus, more dependably track the target. In a long range target acquisition situation targets tend to be unresolved, and therefore are difficult to detect. Background suppression requirements for these types of systems are generally severe, because the tracking system must have a low probability of both missed target detection and false target detection. A high signal to noise ratio is also important. Some prior art methods have attempted to suppress background clutter by means of filters.

One prior art method of filtering background clutter in an autonomous image tracking system, well known to those skilled in the art, is the use of linear spatial filters. A linear filter produces an output which is a linear combination of the elements in a particular processing "window".

A second background clutter filtration method makes use of median and anti-median filters. Median and anti-median filters are non-linear operators in which the individual elements within a processing "window" are ordered and ranked on the basis of amplitude. The output of such a filter is then determined as a specific rank from the collection of amplitudes. These filters eliminate the background clutter on the basis of feature size. A more detailed description of the principles of median and anti-median filters is given below.

A "median" is defined as that value of a group of values which exceeds the values of as many members of the group as it is exceeded by. For example, consider the group of integers (7, 3, 9, 8, 6, 4, 6). Since this set of values has seven numbers, the median of the group will be the fourth largest (or fourth smallest) value. For this sample, 6 is the median since there are three numbers which exceed it and three numbers which it equals or exceeds. In other words, a median value of a set of values is determined by arranging the values in order of ascending (or descending) magnitude, and then selecting the value in the middle of the list. As such, a median can only be defined in terms of a set which has an odd number of values or elements. A median filter is an operator which outputs the median value of an odd numbered group of elements.

An "anti-median" filter is a non-linear operator in which the output of the median filter is subtracted from the value at the geometric center of the original sample group of elements. For example, the center value of the group of elements (7, 3, 9, 8, 6, 4, 6) has a value of 8. Therefore, to calculate the anti-median value we would subtract six from eight (8−6). The output of the anti-median filter would thus be two (2). If the median value occupies the geometric center of the sample, such as in the sample group (7, 3, 9, 6, 8, 4, 6), the anti-median value would have been (6−6)=0.

If an anti-median filter processes a random sequence of values from a common statistical sample, the median value will be at the geometric center of the sample with a probability of at least (1/N), where N is the number of elements in the sample. If the sample size is N=5, then the output of the anti-median filter would be zero 20% of the time.

A probability density function of the output of the anti-median filter can be calculated which would include a certain value at the origin representative of the probability that the anti-median filter output would equal zero (0). Since the cumulative probability obtained by integrating the probability density function from −∞ to +∞ must equal one, the value at the origin of the probability density function will reduce the total remaining area. This property is responsible for the useful noise reduction and clutter suppression properties of the anti-median filter.

It can be shown that a median filter which scans a sample set of an image will suppress or attenuate relatively small objects, whereas an anti-median filter scanning a sample set of an image will attenuate or suppress relatively large objects. Consider the following string of sample values: 0, 0, 0, 0, 3, 3, 3, 0, 0, 0, 0, 1, 0, - - - . It may help to visualize each integer as representative of the magnitude of the intensity of specific pixel elements of an image. Here, the value 0 is a pixel value whose intensity does not exceed a predetermined threshold limit. The value 3 represents higher intensity pixels, and the subset 3,3,3 would be a "blob" in the image. The value 1 is an intensity value which just exceeds the threshold limit and may be the target of interest.

Now consider a scanning median filter which takes the sample set above in five element arrays. The first scanned set would be (0,0,0,0,3). From the discussion above, the output of the median filter would be zero (0) since there would be two (2) values in the set less than or equal to zero (0), and two (2) values in the set greater than or equal to zero (0). For the next set of five elements from the scanning process, i.e., (0,0,0,3,3) the result would be the same. For the next set, i.e., (0,0,3,3,3,) the output would be three (3). This scanning sequence can be continued to get the sequence values of 0,0,3,3,3,0,0,0,0,0,0 - - - as the output of the median filter. It is noted that the sample value 1 has been eliminated. Also from the discussion above for an anti-median value, it can be shown that this sequence of sample elements for an output of an anti-median filter would be 0,0,0,0,0,0,0,0,0,0,1,0, - - - . Here the relatively large values of 3 have been eliminated. Consequently, the "blob" (3,3,3) has been eliminated, and the target of interest (1) has been isolated.

From this analysis it can be shown that a median filter suppresses any object whose size is less than (N+1)/2 pixels or sample values, where N is the number of elements in the sample array. For the above example, N=5, and thus the median filter would suppress any "blob" smaller in size than 3 sample values. An anti-median filter, on the other hand, performs in a complementary manner by preserving all objects whose sizes are less than (N+1)/2. Conceptually, this can be understood in practice by visualizing a distant target against a background scene. The target will appear as a much smaller image signal against the background signals. Consequently, the anti-median filter can be calibrated to suppress any image (signal) larger than a predetermined size; thus, background signals larger than the target signal can be substantially eliminated.

Although an anti-median filter reduces or attenuates large objects, there are many cases where background residues (background leakage) remains unacceptably large. One particularly troublesome type of background leakage is caused by line-like objects in the background clutter. This problem is especially severe if these line segments are oriented perpendicular to the direction of scanning.

Regardless of this drawback, anti-median filters have unique properties which make them superior to linear filters for background suppression applications. For example, they do not produce pre-shoots, overshoots or ringing phenomena when their inputs comprise impulse or step-like functions. Further, they do not attenuate signal components as a function of frequency.

What is needed then is a background clutter suppression filter which includes the unique properties of an anti-median filter, but which substantially reduces many of the background leakage problems generally associated with these types of filters. It is therefore an object of the present invention to provide such a filter.

SUMMARY OF THE INVENTION

Disclosed is a new family of non-linear filters for use in background clutter suppression technology. These filters will be termed minimum difference processor (MDP) filters. An MDP filter can include a spatial or temporal filtering process; however, more practical applications involve spatial filtration.

An MDP filter, according to a preferred embodiment of the present invention, generally comprises a group of anti-median filters arranged in a predetermined geometric pattern. This geometric pattern may include, but is not limited to, a sample array comprising four anti-median filters oriented vertically, horizontally and diagonally to each other. The processing of each filter array can be executed either serially or in parallel. Since the component operations of an MDP filter are hierarchically equivalent, they are commutative. Therefore, the order of serial execution is not relevant.

In a specific embodiment, a sample matrix is scanned across an image such that at each individual scan stop an anti-median value of a horizontal array of the matrix, which includes the center value of the matrix, is determined; an anti-median value of a vertical array is determined, also including the center value; and two diagonal anti-median values are determined, also including the center value. From these four anti-median values, that value corresponding to the smallest absoluted anti-median value is selected as the output of the minimum difference processor filter.

In another embodiment, the value of each of the remaining elements of the matrix which were not included in the previous four anti-median filter arrays can be subtracted from the center value to separately determine a subtracted value for each remaining element. These subtracted values are grouped with the anti-median values, and the lowest absolute value is used to select the member of the group to be outputted.

By this invention, background clutter objects which are greater than the target in a single dimension can be suppressed. Further, additional objects, advantages, and features of the present invention will become apparent from the following description and appended claims, taken in conjunction with the accompanying drawings.

DETAILED DESCRIPTION OF THE PREFERRED EMBODIMENTS

The following description of the preferred embodiment of the present invention is merely exemplary in nature and is in no way intended to limit its applications or uses.

An image processing system generally processes scenes comprising a plurality of pixels, each pixel having a magnitude representation of its intensity (brightness). Generally, background objects will be in the form of "blobs" subtending a plurality of the pixels. An object of interest may be embedded in the background, and thus difficult to separate from the background.

An MDP filter, according to a preferred embodiment of the present invention, comprises a matrix of separate elements, each element representing a single pixel of the image. The matrix generally covers a relatively small area of the image, and is scanned across the remaining area of the image.

The MDP filter can extract an unresolved object from a complex background scene without excessive attenuation even if the object image straddles several continuous component detectors of a focal plane array. For example, a single object inclusive within one section of the matrix can occupy 1 or more detector cells depending on 1) its incidental position on a detector, and 2) the point spread function imposed by the optical system with the detector array.

An MDP filter, according to a specific embodiment of the present invention, is designed to extract objects subtending up to 4 elements arranged in a square pattern. On the other hand, this embodiment necessarily is designed to suppress or eliminate objects subtending more than 2 elements along any direction. This MDP filter consists of a square array of 25 elements (5×5). Four anti-median filter components are configured as (1×5) linear sub-arrays within the MDP filter matrix. These anti-median filters are arranged such that the center element of the (5×5) matrix array spatially coincides with the center element of each dimensional anti-median filter component. One anti-median filter component is oriented horizontally, a second is oriented vertically, and two others are oriented diagonally at 45° and 135° with respect to the coordinate axes defined by the horizontal and vertical components. The optimum size and shape of the matrix depends on the functional application of the MDP filter.

In this embodiment, the MDP filter substantially eliminates "blobs" whose lengths subtend more than 2 pixels in any direction, while at the same time preserves or extracts objects comprising (1×2) or (1×1) or (2×2) elements. An MDP filter can be designed to preserve any range of object sizes and shapes by appropriately choosing the total number of elements in the array. In practice, MDP filters comprising up to (13×13) elements have been successfully demonstrated in computer simulation.

Now turning to FIG. 1 (a)–(e), an MDP filter configuration comprising the above-described (5×5) element matrix is shown. FIG. 1(a) shows the matrix in which each individual element representing an image pixel is numbered. Specifically, each row is represented by a letter from a–e, and each column is represented by a number from 1–5. Therefore, there are 25 individual elements in the matrix array, each one represented by a value defining a specific intensity of that pixel in the image. As is apparent, $c_3$ is the center element of the matrix, and as such, its intensity representation will be included in each anti-median calculation for the first preferred embodiment, as described below. In other words, the center pixel $c_3$ is the focus of each individual scan position of the matrix of the scene. The remaining pixels of the image will be at the center of the matrix at some other time during the scanning process.

Figure 1A:
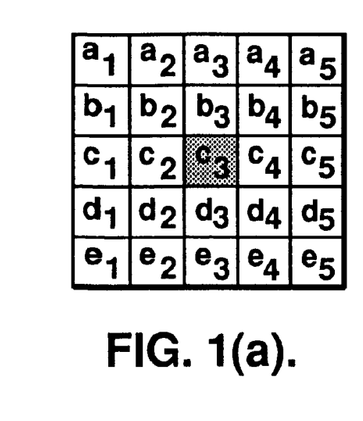
FIG. 1(a)–1(e) is a series of sample matrixes showing the individual sample arrays of 5 element anti-median filters.
Figure 1B:
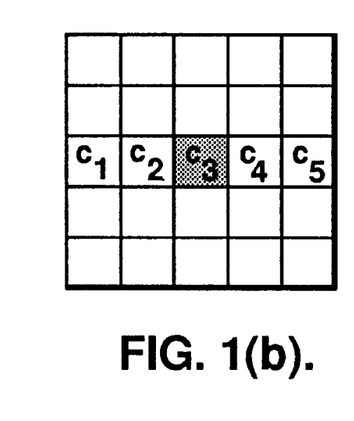

FIG. 1(b) illustrates a (1×5) horizontal anti-median filter whose center element coincides with the center element $c_3$ of the (5×5) MDP filter matrix. As is apparent, the filter array comprises a set of values $c_1$–$c_5$. In operation, the imaging system will determine an intensity value for each individual element $c_1$–$c_5$ and calculate a median (as described above) for this value. An anti-median value, Δ1, is then calculated according to the following formula:

$$\Delta 1 = c_3 - \text{Med}(\text{Row C}),$$

where Med. (Row C) is the median value of Row C. In addition, an absolute value of Δ1 is determined as follows:

$$|\Delta 1| = |c_3 - \text{Med}(\text{Row C})|$$

These values are then saved in an appropriate memory.

Figure 1C:
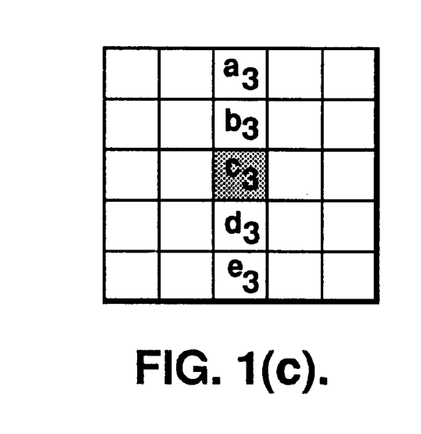

Now turning to FIG. 1(c), a vertical (1×5) anti-median filter, also centered at $c_3$, is shown. This anti-median filter includes the five element intensities $a_3$–$e_3$. As with the horizontal anti-median filter of FIG. 1(b), the following values are calculated and saved, where Δ2 is the anti-median value for the vertical anti-median filter.

$$\Delta 2 = c_3 - \text{Med}(\text{Col. 3})$$

$$|\Delta 2| = |c_3 - \text{Med}(\text{Col. 3})|$$

Figure 1D:
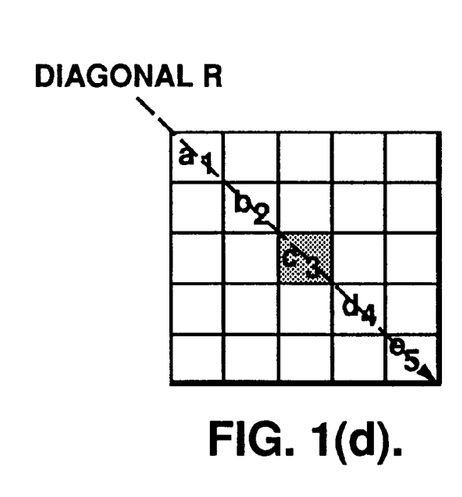
Figure 1E:
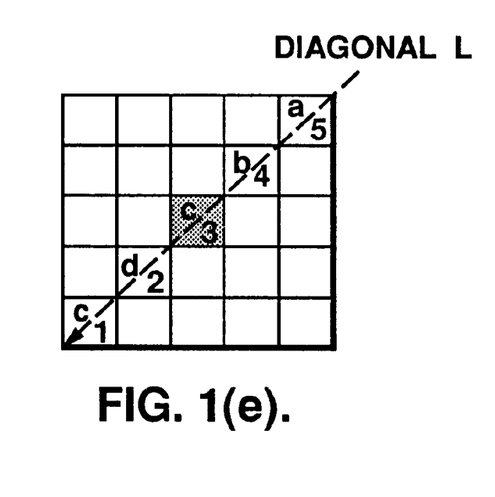
Figure 2A:
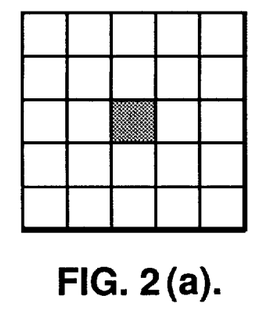
FIG. 2(a)–2(h) is the matrix array of FIG. 1 showing different configurations of elements which are not suppressed by the anti-median filters.
Figure 2B:
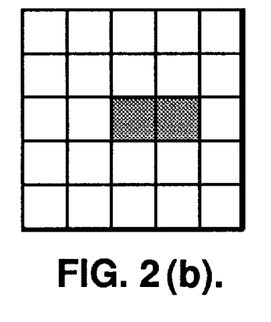
Figure 2C:
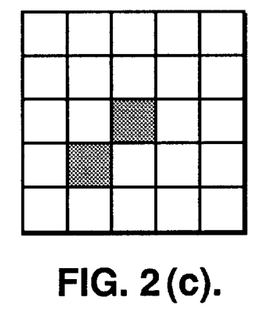
Figure 2D:
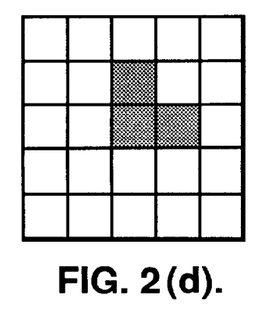
Figure 2E:
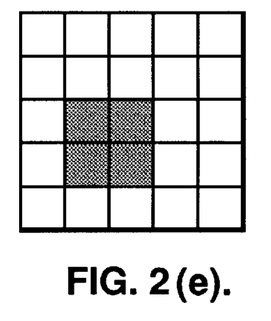
Figure 2F:
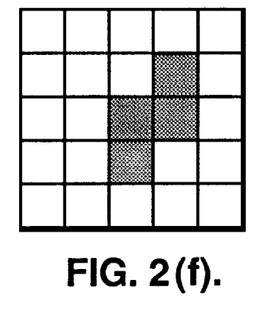
Figure 2G:
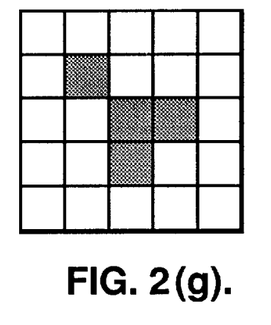
Figure 2H:
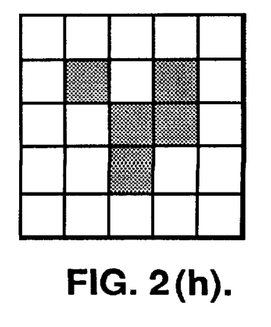

FIGS. 1(d) and 1(e) show two diagonal one-dimensional (1×5) element anti-median sub-arrays, also centered at $c_3$. FIG. 1(d) is a diagonal R (right) selected from the upper left downward to the lower right as shown, and includes the values $a_1$, $b_2$, $c_3$, $d_4$, $e_5$. FIG. 1(e) is a diagonal L (left) array selected from the upper right downward to the lower left as shown, and includes the values $a_5$, $b_4$, $c_3$, $d_2$, $e_1$. The diagonal L anti-median and the diagonal R anti-median filters are oriented at 45° and 135° respectively to the axis formed by the horizontal and vertical arrays. As above, the following quantities are calculated and stored.

$$\Delta 3 = c_3 - \text{Med}(\text{Diagonal R}),$$

$$|\Delta 3| = |c_3 - \text{Med}(\text{Diagonal R})|,$$

$$\Delta 4 = c_3 - \text{Med}(\text{Diagonal L}), \text{ and}$$

$$|\Delta 4| = |c_3 - \text{Med}(\text{Diagonal L})|.$$

The MDP filter matrix is positioned during the scanning process at each location of the image such that each element of the matrix will be occupied with a data sample. In other words, the matrix does not extend beyond the boundaries of the image. The center of the matrix $c_3$ is positioned or scanned to each pixel location of the image where this criterion is fulfilled. As the matrix is scanned across the image, the minimum of the set ($|\Delta 1|$, $|\Delta 2|$, $|\Delta 3|$, $|\Delta 4|$) at each position is selected, and the corresponding value of the set (Δ1, Δ2, Δ3, Δ4) is chosen as the output of the MDP filter for each scan location. After each viable pixel location in the image has been processed by the MDP filter, a new image will have been created by the MDP in which all features and objects larger than (2×2) elements will have been eliminated or substantially suppressed.

FIGS. 2(a)–2(h) show certain object shapes (represented by the shaded pixel areas) which a (5×5) MDP filter would preserve, independent of their respective orientations. These object shapes represent images in the scene which do not subtend more than two (2) pixel elements in any one direction of any of the four anti-median filter arrays. It is noted that the shaded areas in these figures represent objects whose pixel intensities are detectably different from the white background intensities.

In contrast, FIGS. 3(a)–3(k) show a variety of object shapes (represented by the shaded areas) which would be suppressed or eliminated by MDP processing. In each of these examples the number of shaded pixel elements in at least one anti-median filter array exceeds two (2) pixels. By noting the spatial orientation of the anti-median array from which the anti-median value is selected as the MDP filter output, lines and ridges can be detected in the scene, and their orientations determined. Therefore, the MDP filter can be further utilized as a means for detecting certain features in a scene, i.e., roads and rivers.

Figure 3:
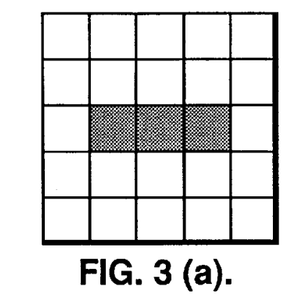
FIG. 3(a)–3(k) is a series of the matrix arrays of FIG. 1 showing individual patterns which would be suppressed by the anti-median filters.

The MDP filter of FIGS. 1–3 are formatted as (5×5) matrixes having four anti-median filters represented by different orientations of (1×5) arrays. As is apparent from FIG. 1, certain outer ring elements, specifically $b_1$, $d_1$, $e_2$, $e_4$, $d_5$, $b_5$, $a_4$ and $a_2$, are not used in the anti-median calculations. These elements have been designated "N" in FIG. 4. Because these elements are not included in the calculations, certain undesirable geometric forms are not eliminated or attenuated as much as desired. The object represented by the shaded area of FIG. 4 is one such example.

Returning to FIG. 4, the object pattern (shaded area) is an image pattern of a line segment and represents a worse case scenario of reduced background suppression by the MDP filter embodiment described above. For a line of this type in the image, the least amount of suppression of this object would occur if the line, represented by the shaded area, were oriented at an angle of approximately 26° (arctan ½) relative to a coordinate axis defined by the horizontal array of $c_1$–$c_5$. In other words, if the angular orientation of this line were less or more than 26°, then either the diagonal L anti-median or the horizontal anti-median would suppress more of the object. The representation of FIG. 3(k) shows the image representation of FIG. 4 having a slightly greater angle than 26°. In that representation the diagonal L sub-array would substantially suppress the image. A worse case orientation of a line object could occur in any quadrant of the array's coordinate axis system.

Figure 4:
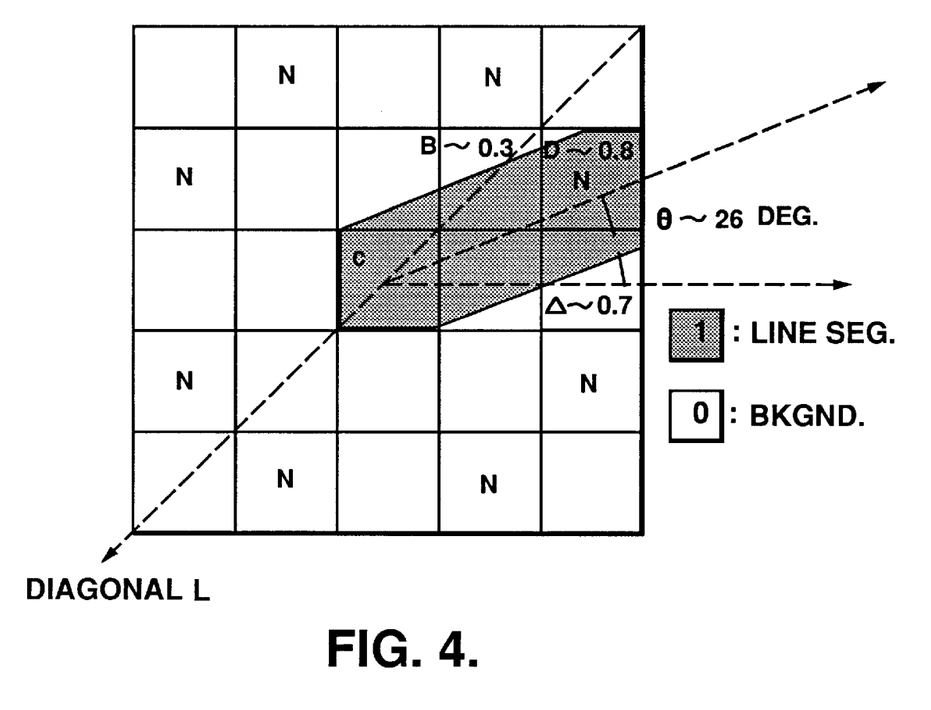
FIG. 4 is the sample matrix of FIG. 1, denoting by "N" the individual elements which are not included in the original preferred embodiment.

In FIG. 4, the intensity of each pixel location in the array is reflected by its proportional shaded portion. In the example shown, a totally shaded cell has a value of one (1), and a totally unshaded cell has a value of zero (0). The horizontal median value for the horizontal anti-median array ($c_1$–$c_5$) is represented by element $c_5$. The anti-median value (A) for the horizontal array is $c_3$ minus $c_5$ which is equal to 0.7, $c_3$ being equal to 1 since it is entirely shaded and $c_5$ being equal to 0.3, the percentage of cell area ($c_5$) which is shaded. The median value for the diagonal L array is occupied by element $b_4$, and the anti-median value (B) for this array is $c_3$ minus $b_4$ which is equal to 0.3. This object would partially survive as undesirable leakage in the embodiment described above.

Undesirable leakage can be substantially reduced by including subtraction values ($c_3$–N) for each of the eight unused elements of the outer ring described above and represented by "N" in FIG. 4. The value of each one of these elements is subtracted from the center value $c_3$ and absoluted as with each of the anti-median values for the horizontal, vertical and diagonal anti-median filters above. In this embodiment, the resulting eight absolute values, perhaps weighted by an arbitrary factor calculated to trade off relative performance in one area for performance in another, are included with the set of the four existing anti-median values to make up a new set having twelve values. The output of the MDP filter would then be the minimum of these twelve values. In the example of FIG. 4, N element $b_5$ has a value of D=0.8 (the percentage of $b_5$ which is shaded). This gives an output of the MDP filter a value of 0.2 ($c_3$–$b_5$, 1–0.8). Therefore, the object of FIG. 4 would be substantially suppressed. By averaging each possible configuration of the object from 0°–360°, this embodiment of the MDP filter reduces average leakage to approximately 0.05 with the input of FIG. 4.

Figure 5:
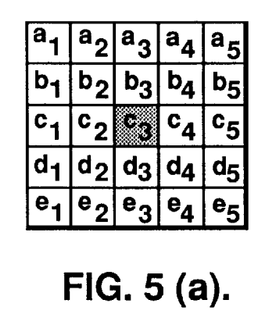
FIG. 5(a)–5(f) is the matrix array of FIG. 1, including the previously unused elements of FIG. 4.
Figure 5B:
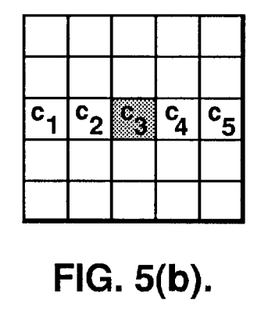
Figure 5C:
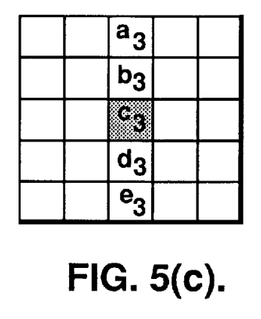
Figure 5D:
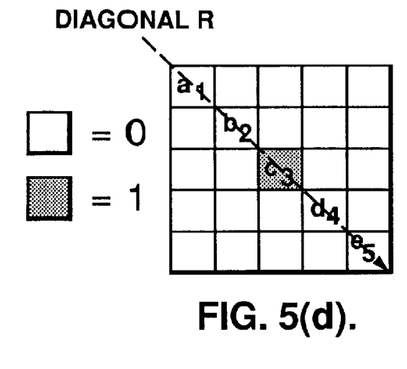
Figure 5F:
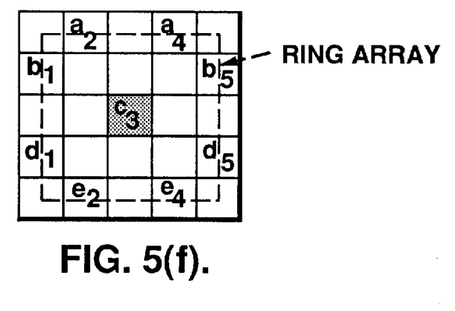

FIGS. 5(a)–5(f) show the matrix of FIG. 1 including the horizontal, vertical, diagonal L, and diagonal R sub-arrays, and further including a ring array (FIG. 5(f)) of the "N" pixels of FIG. 4. The incorporation of these outer ring values in the calculation represents a second preferred embodiment of the MDP filter as discussed above. Although the second preferred embodiment reduces background leakage, it is at the expense of other aspects of performance, such as a small loss of signal to noise ratio and a tendency to lose point-like objects situated on the edge of large background objects, especially if the point-like object has the same brightness as the adjacent background object.

Figure 6:
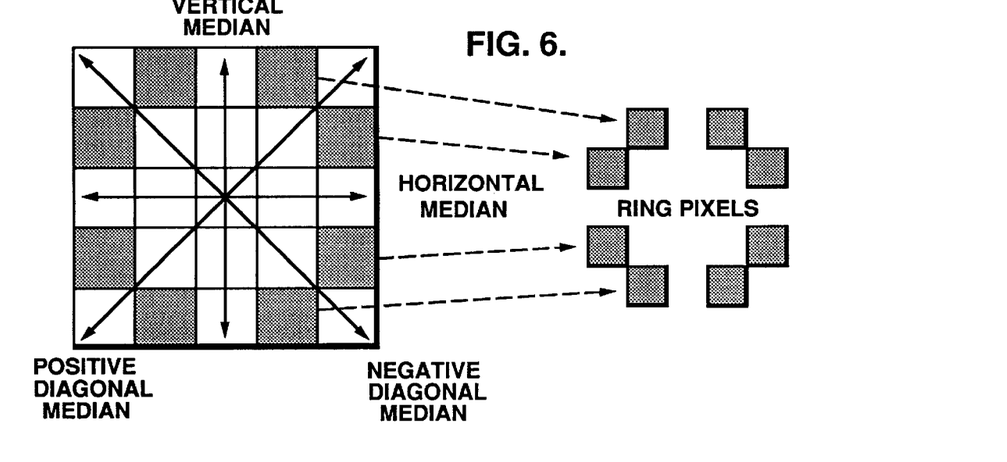
FIG. 6 is another version of the sample matrix of FIG. 4.
Figure 7:
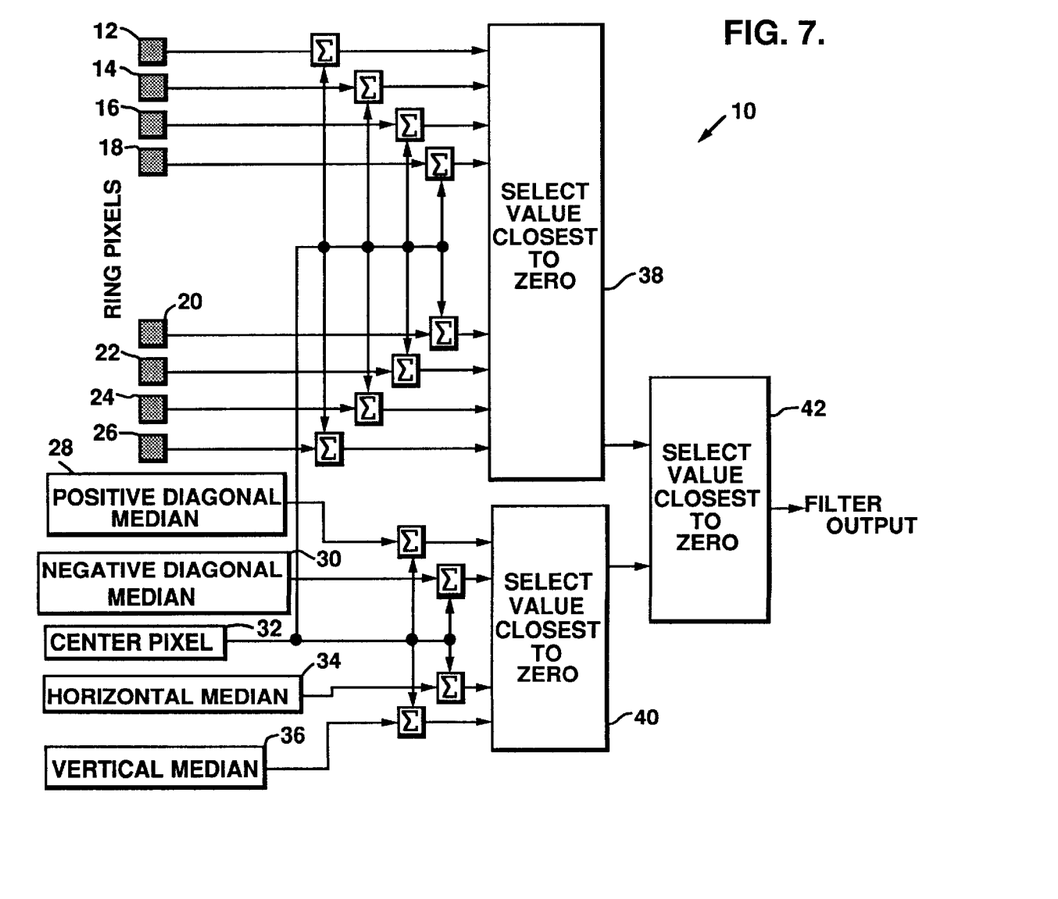
FIG. 7 is a schematic of a preferred embodiment of the present invention.
Figure 8A:
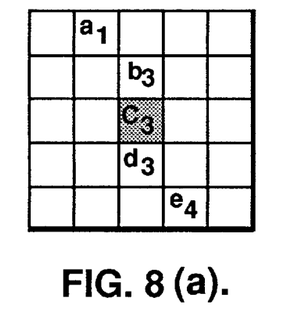
FIG. 8(a)–8(h) is a series of matrix arrays showing additional possible anti-median arrays.
Figure 8B:
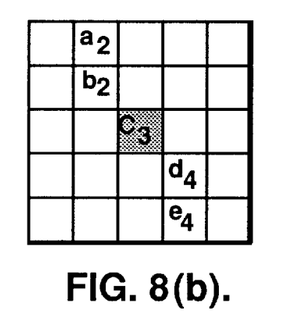
Figure 8C:
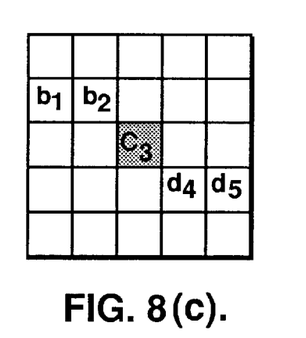
Figure 8D:
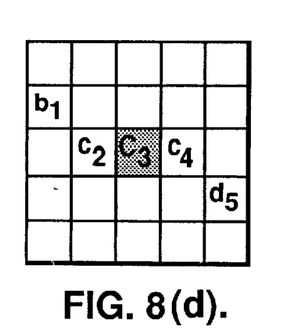
Figure 8E:
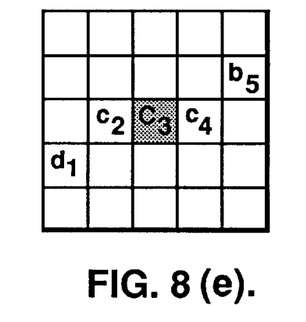
Figure 8F:
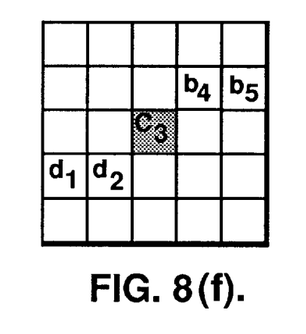
Figure 8G:
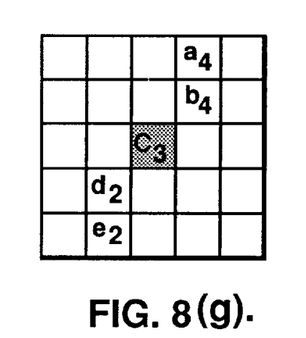
Figure 8H:
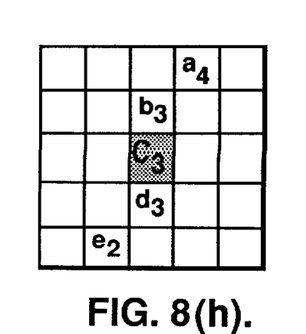

In FIG. 6, a representation of the second embodiment is shown. The white square elements represent the elements which are used in the first preferred embodiment of the horizontal, vertical and diagonal anti-median filters. The shaded elements are the ring elements for the second preferred embodiment as described above, each one possibly having a separate value. FIG. 7 discloses a system 10 showing a schematic implementation for developing an MDP filter output from the inputs of the anti-median filters and ring elements represented in FIG. 6.

Returning to FIG. 7, each ring element of FIG. 6 is represented by an input from blocks 12, 14, 16, 18, 20, 22, 24 and 26. The inverse of each one of these inputs is applied to a separate summing junction along with the center pixel ($c_3$) represented by input block 32. The output from each summing junction for the eight ring element is applied to a circuit 38 which selects one of the eight inputs closest to zero. In addition, the inverses of the diagonal L median value represented by block 28; the diagonal R median value represented by block 30; the horizontal median value represented by block 34; and the vertical median value represented by block 36 are each applied to separate summing junctions along with the center element value of block 32 to determine the anti-median values as described above. The outputs from each of these summing junctions are applied to a circuit 40 for determining the value closest to zero. The outputs from circuits 38 and 40 are applied to another circuit 42 for determining the valued closest to zero of these two outputs. Finally, the filter output taken from circuit 42 is representative of the minimum value of the subtracted ring element values and the anti-median values of the eight ring elements and the four anti-median filter values. This output is used to generate an image in which the background clutter is suppressed.

The first embodiment described above discloses an MDP filter with four anti-median sub-arrays. This description has been used merely as an example. The second preferred embodiment utilizes the pixels which are not included in the four anti-median sub-arrays of the first embodiment. These ring pixels, however, do not represent actual median values, and therefore do not produce the same kind of performance. In addition, the matrices of the preferred embodiments described above are symmetrical with respect to a center, i.e., square. It is entirely within the scope of the present invention to incorporate an MDP filter having any reasonable shape or size, as long as it comprises an odd number of pixel elements. Therefore, other configurations, including anti-median arrays having unequal sub-array lengths (as long as they are an odd number) and/or anti-median arrays incorporating more or fewer than four arrays fall within the scope and spirit of the invention. The center element need not be located at the center of the matrix, so long as it is common to each individual sub-array.

FIG. 8 discloses eight additional anti-median sub-arrays which could have been included with the original four anti-median sub-arrays. Specifically, FIG. 8(a) includes the (1×5) element array of ($a_2$, $b_3$, $c_3$, $d_3$, $e_4$); FIG. 8(b) includes the (1×5) element array of ($a_2$, $b_2$, $c_3$, $d_4$, $e_4$); FIG. 8(c) includes the (1×5) element array of ($b_1$, $b_2$, $c_3$, $d_4$, $d_5$); FIG. 8(d) includes the (1×5) element array of ($b_1$, $c_2$, $c_3$, $c_4$, $d_5$); FIG. 8(e) includes the (1×5) element array of ($d_1$, $c_2$, $c_3$, $c_4$, $b_5$); FIG. 8(f) includes the 1×5) element array of ($d_1$, $d_2$, $c_3$, $b_4$, $b_5$); FIG. 8(g) includes the (1×5) element array of ($e_2$, $d_2$, $c_3$, $b_4$, $a_4$); FIG. 8(h) includes the (1×5) element array of ($e_2$, $d_3$, $c_3$, $b_3$, $a_4$). By this type MDP filter, each pixel is represented in the matrix in at least one anti-median sub-array, and thus the performance of the device is enhanced over the original four sub-array matrix of the first preferred embodiment, and would more effectively suppress the line segment shown in FIG. 4. These MDP filters are also subject to the requirement that the center pixel is common to each array.

Figure 9A:
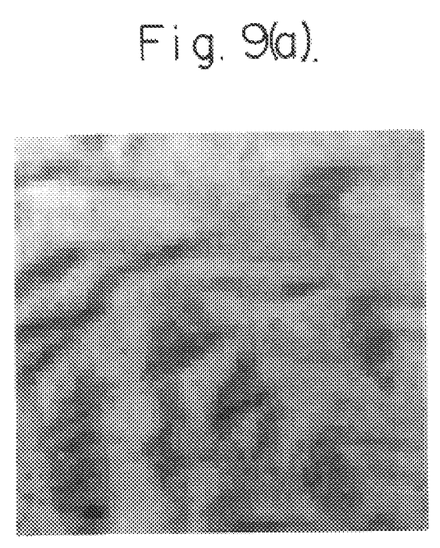
FIG. 9(a)–9(d) is a series of photographic images showing the effectiveness of the preferred embodiments of the present invention.

FIG. 9(a)–(d) is a group of photo reproductions, showing computer simulated performance of both preferred embodiments of the MDP filters. FIG. 9(a) represents an image having severe background clutter represented by certain intensity distributions. A box encircles the target of interest in the upper right hand section of the image.

Figure 9B:
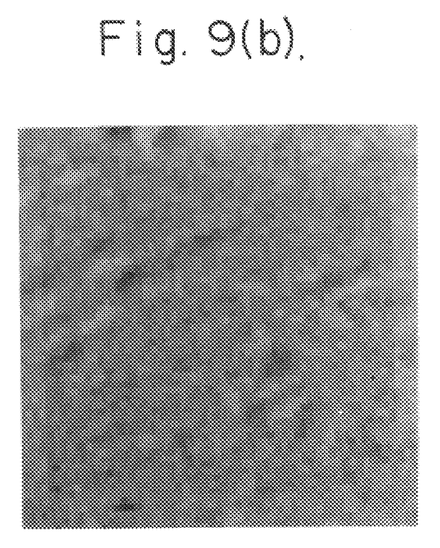

FIG. 9(b) shows an image derived from the original image of FIG. 9(a) by filtering with four cascaded anti-median filters. The cascaded anti-median filter arrangement is such that the anti-median values are calculated consecutively. The five element cascaded anti-median filters were arranged horizontally, vertically and diagonally at 45 and 135°, respectively.

Figure 9C:
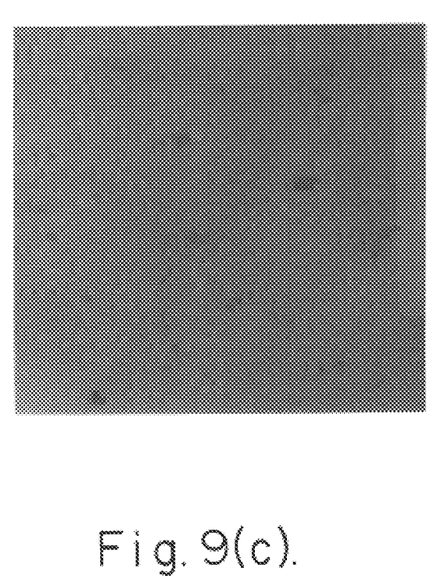
Figure 9D:
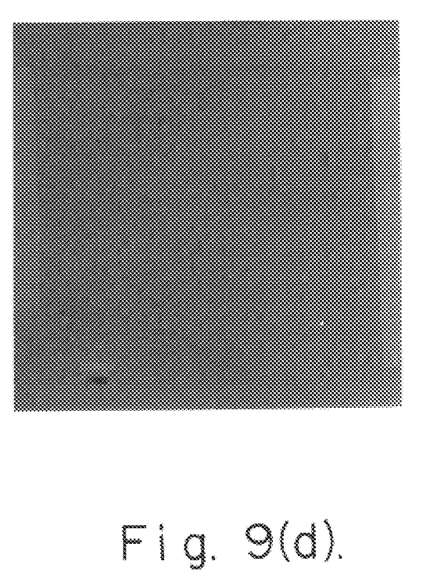

FIGS. 9(c) and (d) represent filtered images utilizing the first and second preferred embodiments respectively of the MDP filters as described above. In each figure, the object of interest is enclosed in a square box.

In general, MDP filters are highly effective as background clutter suppressors, and further, their performance in the presence of gaussian noise is excellent. It has been shown by analysis and simulation using actual data that the performance of MDP filters substantially exceeds that of linear matched spatial filters in terms of cluttered suppression, and equals or exceeds the signal-to-noise performance of linear matched spatial filters above a certain calculatable input threshold signal to noise ratio. MDP performance drops below the performance of linear matched spatial filters in a manner similar to other non-linear processes as the input signal to noise ratio deteriorates below this threshold level. Since this SNR threshold is quite low (approximately 5 for a (5×5) element MDP array), the superior clutter suppression properties of MDP filters makes this type of filter particularly attractive for many applications.

Because of the high level of performance achievable, MDP filters can be employed in many applications where it is necessary to acquire and track unresolved objects embedded in severe background clutter. Although MDP filters are especially suited for background suppression applications, other potential uses will suggest themselves to those skilled in the art. For example, an MDP filter can be used to find line segments in a scene, such as may be associated with roads and rivers, and the orientation of these objects can be determined.

The foregoing discussion discloses and describes merely exemplary embodiments of the present invention. One skilled in the art will readily recognize from such discussion, and from the accompanying drawings and claims that various changes, modifications and variations can be made therein without departing from the spirit and scope of the invention as defined in the following claims.

What is claimed is:

1. Apparatus for producing a second image having reduced background clutter from a first image of a scene containing an object of interest, said apparatus comprising:

a memory for temporarily storing a group of pixel elements in the first image, each pixel element having a value representative of image intensity at an associated position in the first image;

a selector for selecting a value of a center pixel element located within the group;

means for determining a median value of the pixel element values of a first array in the group including the center element;

means for determining a median value of the pixel element values of a second array in the group including the center element in the second array;

means for generating the difference between the median value of the first array and the value of the center element to generate an anti-median value of the first array;

means for generating the difference between the median value of the second array and the value of the center element to generate an anti-median value of the second array; and means for generating, for each pixel position in the first image, a filtered output having a value which is the lesser of the anti-median value of the first array and the anti-median value of the second array; and means for creating a second image of reduced background clutter from the filtered outputs.

2. The apparatus of claim 1 wherein said first array comprises a sequence of horizontally located elements in said group; and wherein said second array comprises a sequence of vertically located pixel elements in said group.

3. The apparatus of claim 2 wherein the group is an (N×M) matrix, where N and M are odd integers.

4. The apparatus of claim 3 where in the said group is 5×5 array of pixel elements.

5. The apparatus of claim 1 which further comprises:

means for determining a median value of the pixel element values of a third array in the group in which said single element is the center element in the third array, and the remaining pixels in the third array run diagonally in said group;

means for generating the difference between the median value of the third array and the value of the single element to generate an anti-median value of the third array; and wherein said second image has pixel values comprising the lowest of the anti-median values of the first, second, and third arrays.

* * * * *